(12) United States Patent
Herchenbach et al.

(10) Patent No.: US 6,616,536 B2
(45) Date of Patent: Sep. 9, 2003

(54) CENTERED DOUBLE UNIVERSAL JOINT

(75) Inventors: Paul Herchenbach, Ruppichteroth (DE); Martin Hector, Siegburg (DE); Eberhard Wilks, Daufenbach (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/199,437

(22) Filed: Jul. 19, 2002

(65) Prior Publication Data

US 2003/0017875 A1 Jan. 23, 2003

(30) Foreign Application Priority Data

Jul. 20, 2001 (DE) .......................... 101 35 346

(51) Int. Cl.[7] ............................... F16D 3/26
(52) U.S. Cl. ..................... 464/118; 464/14; 464/905
(58) Field of Search ........................... 464/11, 12, 13, 464/14, 112, 117, 118, 128, 905

(56) References Cited

U.S. PATENT DOCUMENTS

| | | | |
|---|---|---|---|
| 3,470,712 A | * 10/1969 | Geisthoff et al. | ........... 464/118 |
| 4,257,243 A | 3/1981 | Herchenbach | |
| 4,261,186 A | 4/1981 | Hopf et al. | |
| 4,464,136 A | * 8/1984 | Konrad et al. | ........... 464/14 |
| 4,490,125 A | * 12/1984 | Konrad et al. | ........... 464/11 |
| 4,650,439 A | * 3/1987 | Mayhew | ........... 464/11 |
| 4,781,662 A | 11/1988 | Mayhew et al. | |
| 4,997,407 A | 3/1991 | Kretschmer et al. | |

FOREIGN PATENT DOCUMENTS

| | | |
|---|---|---|
| DE | 28 02 572 C2 | 7/1982 |
| DE | 39 21 242 C1 | 6/1990 |

* cited by examiner

Primary Examiner—Lynne H. Browne
Assistant Examiner—Kenn Thompson
(74) Attorney, Agent, or Firm—Harness, Dickey & Pierce, P.L.C.

(57) ABSTRACT

A centered double universal joint has a first outer joint yoke 1 with first outer yoke arms 2 connected to one another by a first bridge 3. A first cenering mechanism 4, 6 is on the first bridge 3. A first inner joint yoke 8 couples with the first inner yoke arms. A first cross member 10 connects the first outer yoke arms 2 to the first inner yoke arms. The first cross member 10 has a first lubricant supply 44, 47. A second outer joint yoke 12 with second outer yoke arms 13 are connected to one another by a second bridge 14. Second centering mechanism 15, 17 is on the second bridge 14. A second inner joint yoke 19 couples with the second inner yoke arms. A second cross member 21 connects the second outer yoke arms 13 to the second inner yoke arms. The second cross member 21 has a second lubricant supply 44', 47'. A guiding disc 25, defining a longitudinal axis 31, has a first central centering projection 28 articulatably connected to the first centering means 4, 6. Guiding faces 32, 33 on the guiding disc 25 are guided in an annular recess 24 of a housing 9, 20. The annular recess 24 is delimited by a first sealing face 54 and by a second sealing face 55. A first lubricating groove 58, in the first sealing face 54, is connected to the first lubricant supply 44, 47. A second lubricating groove 59, in the second sealing face 55, is connected to the second lubricant supply 44', 47'.

5 Claims, 1 Drawing Sheet

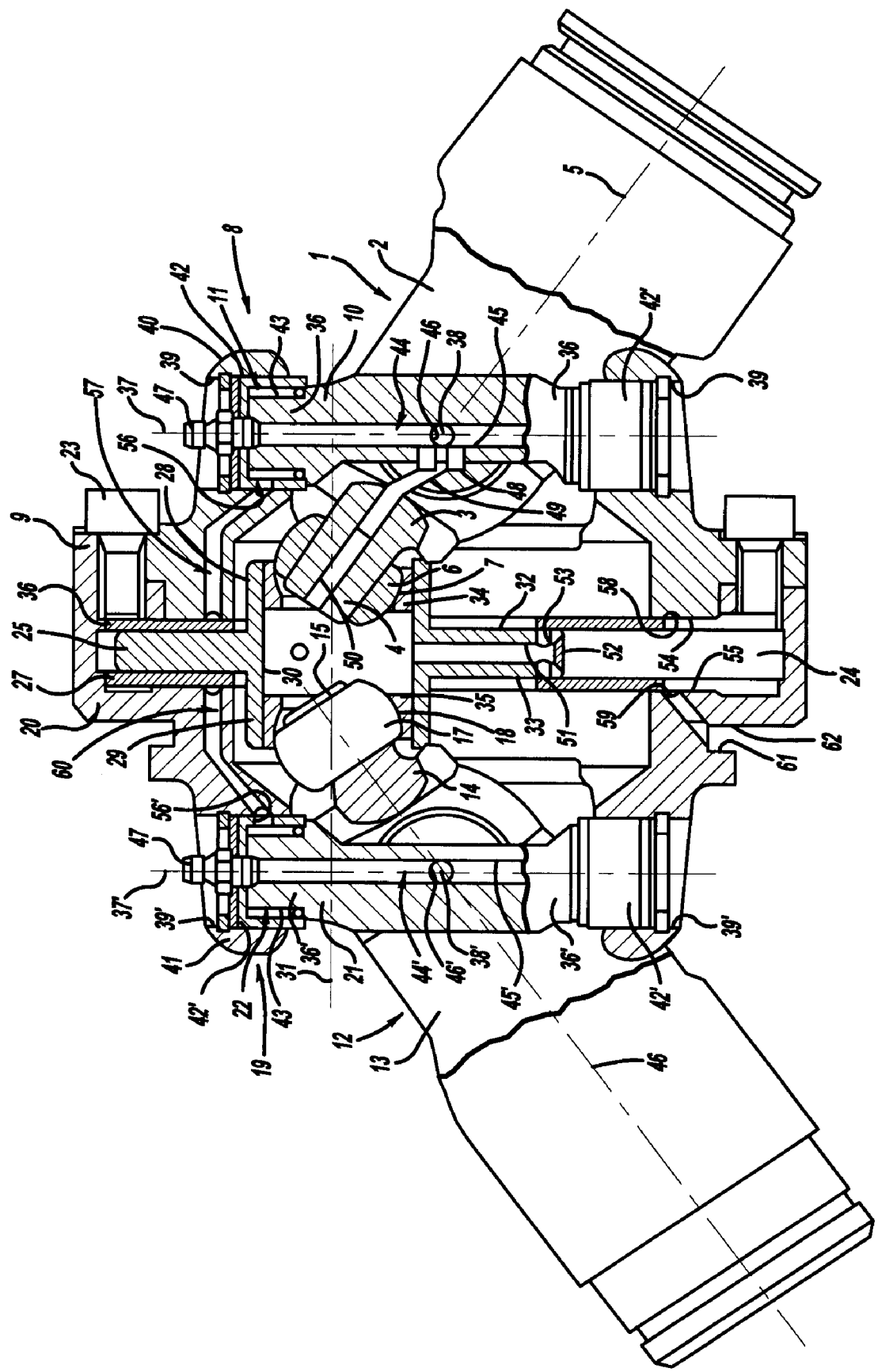

CENTERED DOUBLE UNIVERSAL JOINT

CROSS-REFERENCE TO RELATED APPLICATIONS

This application claims priority to German Patent Application No. 10135346.4 filed Jul. 20, 2001, which application is hereby expressly incorporated by reference.

FIELD OF THE INVENTION

The invention relates to a centered double universal joint, especially for driving, or for drives in, agricultural implements and tractors.

BACKGROUND OF THE INVENTION

DE 39 21 242 C1 (which is the priority document for U.S. Pat. No. 4,997,407) describes a centered double universal joint with two outer joint yokes articulatably connected by a cross member to two inner joint yokes to form part of a housing. An annular recess is formed in the housing. A guiding disc is radially adjustably supported in the housing. Floating annular guiding plates sandwich the guiding disk. The guiding disc includes a centrally arranged guiding projection. The projection projects from both sides of the guiding disc. The outer joint yokes, whose yoke arms are connected to one another by a bridge, each include a journal projection. The journal projection includes a spherical face and is pivotably supported in a bore of the central guiding projection of the guiding disc. The cross members each include lubricating channels which are used to lubricate rolling bearings. The rolling bearings support the cross member in the yoke arms. The lubricating channels are each connected to lubricant guiding means in the journal projections. The channels open into the bore of the central guiding projection of the guiding disc. At least one radially extending lubricant channel is provided in the guiding disc. The channel connects the bore in the central guiding projection to the annular recess. It is thus possible to convey lubricant from a lubricating nipple, provided at the cross member, into the annular recess. The disadvantage, however, is that at high rotational speeds of the double universal joint, the lubricant is thrown radially outwardly as a result of the centrifugal forces. This has an adverse effect on the lubrication of the guiding disc and the guiding plates.

DE 28 02 572 C2 (which is the priority document for U.S. Pat. No. 4,257,243) discloses a centered double universal joint wherein a guiding disc, articulatably connected via centring projections to outer joint yokes, is radially adjustably guided in an annular recess. The housing includes a lubricating nipple which is directly connected to the annular recess by a lubricant channel. Thus, the rolling bearings of the cross members and the annular recesses are lubricated independently of one another. Accordingly, the lubricant is pressed radially outwardly by the centrifugal forces.

SUMMARY OF THE INVENTION

It is an object of the present invention to provide a centered double universal joint with a guiding disc that improves lubrication of the guiding disc.

In accordance with the invention, a centered double universal joint includes a first outer joint yoke with first outer yoke arms. A first bridge connects the first outer yoke arms to one another. A first centring mechanism is associated with the first bridge.

A first inner joint yoke is provided with first inner yoke arms. A first cross member articulatably connects the first outer yoke arms by rolling bearings to the first inner yoke arms. The inner yoke arms include a first lubricant supply to lubricate the rolling bearing.

A second outer joint yoke is provided with second outer yoke arms. A second bridge connects the second outer yoke arms to one another. A second centring means is associated with the second bridge. A second inner joint yoke is provided with second inner yoke arms. A second cross member articulatably connects the second outer yoke arms by rolling bearings to the second inner yoke arms. The second inner yoke arms includes a second lubricant supply to lubricate the rolling bearings.

A guiding disc defines a longitudinal axis. The guiding disc has a first central centring projection articulatably connected to the first centring mechanism of the first outer joint yoke. The guiding disk has a second central centring projection articulatably connected to the second centring mechanism of the second outer joint yoke. Guiding faces guide the guiding disc in an annular recess of a housing. The annular recess is delimited by a first radially extending annular sealing face and by a second radially extending annular sealing face. The guiding faces of the guiding disc are radially displaceably guided relative to the sealing faces. The annular recess is closed on the radial outside and open on the radial inside.

A first lubricating groove is provided in the first sealing face. The first lubricating groove extends coaxially relative to the longitudinal axis of the guiding disc. The first lubricating groove is arranged near the inner diameter of the annular recess. The first lubricating groove is connected to the first lubricant supply of the first cross member.

A second lubricating groove is provided in the second sealing face. The second lubricating groove extends coaxially relative to the longitudinal axis of the guiding disc. The second lubricating groove is arranged near the inner diameter of the annular recess. The second lubricating groove is connected to the second lubricant supply of the second cross member. The first inner joint yoke and the second inner joint yoke form part of the housing.

An advantage of this design is that, due to the first lubricating groove and the second lubricating groove each provided in one of the sealing faces, the sealing faces are directly lubricated Lubricant is introduced directly into the region between the sealing faces and the respective guiding face when the guiding disc is guided directly in the annular recess and the guiding faces of the guiding disc are in direct contact with the sealing faces of the annular recess. When the guiding disc is radially displaced, the guiding faces are lubricated over the largest possible area due to the lubricating grooves being arranged near the inner diameter of the annular recess.

According to a preferred embodiment, annular guiding plates are arranged on both sides of the guiding disc in the annular recess. The outer diameter of the guiding plates is greater than the inner diameter of the annular recess and smaller than the greatest diameter of the annular recess. The inner diameter of the guiding plates is greater than the outer diameter of the guiding projections of the guiding disc and smaller than the outer diameter of the guiding disc. In this embodiment, lubricant is introduced directly, via the lubricating grooves, into the region between a lubricating groove and a guiding face of the respective guiding plate.

According to one embodiment, a first lubricant guiding means is provided in the housing to connect the first lubricant supply of the first cross member to the first lubricating groove. A second lubricant guiding means is provided in the housing to connect the second lubricant supply, of the second cross member, to the second lubricating groove.

Accordingly, it is possible to avoid providing separate lubricating nipples for the lubricating grooves and for lubrication of the rolling bearings of the cross members. The lubricant guiding means make it possible for one cross member and one lubricating groove to form one circuit for lubricating purposes. Thus, during lubrication of the cross member, the lubricating groove is likewise supplied with lubricant at the same time.

The housing includes a circumferential groove to rotatingly receive a protective device. The protective device extends coaxially relative to the longitudinal axis. The recess is connected to one of the lubricating grooves to prevent rotating parts of the double universal joint from being touched. By connecting the circumferential groove to one of the lubricating grooves, the circumferential groove is also incorporated in the lubrication circuit.

Accurate control of the two double universal joints and a long service life are achieved at the guiding disc by providing a cylindrical bearing bore which extends coaxially relative to the longitudinal axis through the first centring projection and the second centring projection. The first centring means and the second centring means each include a bearing journal which extends coaxially relative to an axis of rotation of the respective outer joint yoke.

A bearing ball in the form of a spherical layer is provided per bearing journal. The bearing ball is positioned on the bearing journal via a through bore. The bearing ball is held at least axially relative to the axis of rotation. The bearing ball has a spherical outer face.

A bearing race is provided per bearing ball. The bearing race supports the outer face of the bearing ball in a corresponding hollow-spherical bore. The bearing race has a cylindrical outer face by means of which the bearing race is axially adjustably positioned in the cylindrical bearing bore of the guiding disc.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a cross section view of a double universal joint according to the present invention.

DETAILED DESCRIPTION OF THE PREFERRED EMBODIMENTS

The following description of the preferred embodiment(s) is merely exemplary in nature and is in no way intended to limit the invention, its application, or uses.

The FIGURE is a side view of an inventive double universal joint, partially in section. The double universal joint includes two individual universal joints which are connected to one another via a centring mechanism such that both joints each accommodate half the angle of articulation when an input shaft is articulated relative to an output shaft in order to ensure constant velocity. The two individual joints are substantially identical in design.

The double universal joint has a first outer joint yoke 1 with two first outer yoke arms 2. The first outer yoke arm free ends are connected to one another by a first bridge 3. The first bridge 3 carries a first bearing journal 4 defining a first axis 5. The outer face of the first bearing journal 4 is cylindrical. A first bearing ball 6, in the form of a spherical layer, is immovably held on the first bearing journal 4 along the first axis 5. The spherical outer face of the first bearing ball 6 is given the reference number 7. The first outer joint yoke 1 is articulatably connected to the first inner joint yoke 8 via a first cross member 10 by a rolling bearing 11. The first inner joint yoke 8, with its two yoke arms, is integral with a first bearing housing 9.

The second joint includes a second outer joint yoke 12 with two outer yoke arms 13. Again, only one yoke arm is visible. The two second yoke arms 13 are connected to one another by a second bridge 14. The second bridge 14 carries a second bearing journal 15. The bearing journal 15 has a cylindrical outer face and is centered on the second axis 16. A second bearing ball 17 is immovably and axially held on the second bearing journal 15 along the second axis 16. The second bearing ball 17 has a spherical outer face 18. The second outer joint yoke 12 is articulatably connected to the yoke arms 13 of the second inner joint yoke 19 via a second cross member 21 by rolling bearings. The yoke arms 13 of the second inner joint yoke 19 is produced to be integral with a second bearing housing portion 20.

The first bearing housing portion 9 and the second bearing housing portion 20 are removably connected to one another by bolts 23. The two housing portions 9, 20, together, form a radially outwardly closed and radially inwardly open annular recess 24. A guiding disk 25 is radially adjustably accommodated in the recess 24 together with a first guiding plate 26 and a second guiding plate 27. The plates 26, 27 are radially displaceable received between an annular first sealing face 54 and an annular second sealing face 55 of the annular recess 24. The diameters of the two annular guiding plates 26, 27 of the guiding disc 25 and of the annular recess 24 are adjusted to one another such that the articulation-related displacement of the guiding disc 25 in the annular recess 24 can be carried out, however, the guiding disc 25 is securely held in the recess. Accordingly, the greatest diameter of the annular recess 24 is greater than the outer diameter of the two annular guiding plates 26, 27 and greater than the outer diameter of the guiding disc 25. The inner diameter of the two annular guiding plates 26, 27 is smaller than the outer diameter of the guiding disc 25.

The guiding disc 25 has a first centring projection 28 and a second centring projection 29. A cylindrical bearing bore 30 is provided with projections defining a longitudinal axis 31. The first centring projection 28 projects beyond a first guiding face 32 of the guiding disk 25. The second centring projection 29 projects beyond a second guiding face 33 of the guiding disc 25. This is the reason why the smallest diameter of the annular recess 24 is greater than the outer diameter of the guiding projections 28, 29. Furthermore, the inner diameter of the annular guiding plates 26, 27 also has to be greater than the outer diameter of the guiding projections 28, 29.

A first bearing race 34 is positioned on first bearing ball 6. The hollow-spherical bore of the first bearing race is adapted to the spherical outer face 7 of the first bearing ball 6. The first bearing race 34 has a cylindrical outside surface. The first bearing race is displaceably guided in the bearing bore 30. The second bearing ball 17, via its spherical outer face 18, is received in a corresponding hollow-spherical bore of a second bearing race 35. The second bearing race 35 is also received in the bearing bore 30 by its cylindrical outer surface.

The two cross members 10, 21 each include four trunnions 36. Two trunnions are always arranged on a common trunnion axis 37, 38. By means of rolling bearings 11, 22, the trunnions 36 are supported in bores 39 of the yoke arms 2, 13, 40, 41. The rolling bearings 11, 22 each include a bearing bush 42 arranged in the respective bore 39. Rolling members 43 roll on the outer surface of the respective trunnion 36 and on an inner face of the respective bearing bush 42.

For the purpose of lubricating the rolling bearing 11, the first cross member 10 includes a first lubricant channel 44. The channel 44 has a bore 45 which extends along the trunnion axis 37 of two trunnions 36. The first lubricant channel 44 has a bore 46 which extends along the other trunnion axis 38. The bores 45, 46 start from the end face of a trunnion 36 and end in an end face of the remote trunnion 36. The bores 45, 46 intersect one another in the center of the cross member 10. One of the trunnions 36 includes a lubricating nipple 47 which, together with the first lubricant channel 44, forms a first lubricant supplying circuit.

The bearing bush 42 of the trunnion 36 of the first cross member 10, which trunnion 36 is connected to the lubricating nipple 47, has a through-bore 56. The through-bore 56 extends radially relative to the respective trunnion axis 37. The through-bore 56 connects the rolling bearings 43 to the first lubricant guiding mechanism 57. The first lubricant guiding mechanism 57 leads to a first lubricating groove 58. The first lubricating grooves 58 extends coaxially relative to the longitudinal axis 31 in the first sealing face 54. It is thus possible to convey lubricant from the lubricating nipple 47 of the first cross member 10 to the first lubricating groove 58. Thus, the first guiding plate 26 is lubricated for guiding purposes. The lubricant is applied directly to the region between the first sealing face 54 contacting the face of the first guiding plate 26. Since the first lubricating groove 58 is arranged close to the smallest diameter of the annular recess 24, the first guiding plate 26, when radially displaced within the annular recess 24, is lubricated over a large radial area.

The second sealing face 55 includes a second lubricating groove 59. The lubricating groove 59 is arranged in a mirror-image-like relationship to the first lubricating groove 58. Accordingly, via second lubricant guiding mechanism 60, the second lubricating groove 59 is connected to a bearing bush 42' of the second cross member 21.

The second bearing housing portion 20 comprises a circumferential groove 61. A protective device can be rotatingly received in groove 61. The purpose of the protective device is to prevent contact of the rotating parts of the double universal joint. Starting from its base, the circumferential groove 61 is connected, via a bore 62, to the second lubricating groove 59. The circumferential groove 61 is thus integrated into the lubrication circuit including the second lubricating groove 59 and the second lubricant channel 44' of the second cross member 21.

A bore 48 is in the first cross member 10 in a plane extending perpendicularly relative to the plane extending through the two trunnion axes 37, 38. The bore 48 leads to the first lubricant channel 44. A flexible hose 49 is inserted into the channel 44. The flexible piece of hose 49 leads to the lubricant channel 50. The hose 49 is inserted into channel 50 which is a bore in the first bearing journal 4. The lubricant channel 50 ends in the bearing bore 30.

Lubricant channels 51 are formed in the guiding disc 25. The lubricant channels 51 are radial bores leading from the bearing bore 30 to the annular recess 24. Through-bores 53 are provided near an outer circumferential face 52 of the guiding disc 25. The outer circumferential face 52 is delimited by the guiding faces 32, 33. The through-bores 53 form a further part of the lubricant channel 51. The bores 53 extend axis-parallel to the longitudinal axis 31 and intersect a radial bore of the respective lubricant channel 51. Thus, each through-bore 53 leads from the first guiding face 32 to the second guiding face 33. This means that the guiding faces 32, 33 are directly lubricated. Thus, the lubricant is provided between the guiding faces 32, 33 and the respective surface of the guiding plates 26, 27. The through-bore 53 is arranged on a diameter around the longitudinal axis. The diameter ensures that the through-bores 53 are closed by the guiding plates 26, 27 in each angular position of the two joints.

The second cross member 21 is identical to the first cross member 10. The second cross member 21 is provided with the same reference numbers.

It is also possible for the guiding disc to be supported in an annular recess without being sandwiched between guiding plates. The lubricant, in this case, is guided through the through-bores into the region between the sealing faces and the sliding faces of the annular recess.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A centered double universal joint comprising:

a first outer joint yoke with first outer yoke arms;

a first bridge connecting the first outer yoke arms to one another;

first centering mechanism associated with the first bridge;

a first inner joint yoke with first inner yoke arms;

a first cross member articulatably connecting the first outer yoke arms via rolling bearings, to the first inner yoke arms and comprising a first lubricant supply for lubricating the rolling bearing;

a second outer joint yoke with second outer yoke arms;

a second bridge connecting the second outer yoke arms to one another;

second centering mechanism associated with the second bridge;

a second inner joint yoke with second inner yoke arms;

a second cross member articulatably connecting the second outer yoke arms, via rolling bearings, to the second inner yoke arms and comprising a second lubricant supply for lubricating the rolling bearings;

a guiding disc defining a longitudinal axis, a first central centering projection on said guiding disk articulatably connected to the first centering mechanism of the first outer joint yoke, a second central centering projection on said guiding disk articulatably connected to the second centering mechanism of the second outer joint yoke, guiding faces on said guiding disc guided in an annular recess of a housing, said annular recess delimited by a first radially extending annular sealing face and by a second radially extending annular sealing face, the guiding faces of the guiding disc are radially displaceably guided relative to said sealing face and the annular recess being closed on the radial outside and open on the radial inside;

a first lubricating groove in the first sealing face, said first lubricating groove extends coaxially relative to the longitudinal axis of the guiding disc, said first lubricating grove being arranged near the inner diameter of the annular recess and said first lubricating groove connected to the first lubricant supply of the first cross member;

a second lubricating groove in the second sealing face, said second lubricating groove extending coaxially relative to the longitudinal axis of the guiding disc, said second lubricating groove arranged near the inner diameter of the annular recess and said second lubricating groove connected to the second lubricant supply of the second cross member;

said first inner joint yoke and said second inner joint yoke forming part of the housing.

2. A centered double universal joint according to claim 1, wherein annular guiding plates are arranged on both sides of the guiding disc in the annular recess, said guiding plates having an outer diameter being greater than the inner diameter of the annular recess and smaller than the greatest diameter of the annular recess, and said guiding plates having an inner diameter being greater than the outer diameter of the guiding projections of the guiding disc and smaller than the outer diameter of the guiding disc.

3. A centered double universal joint according to claim 1, wherein first lubricant guiding means being provided in the housing connecting the first lubricant supply of the first cross member to the first lubricating groove and second lubricant guiding means provided in the housing connect the second lubricant supply to the second lubricating groove.

4. A centered double universal joint according to claims 1, wherein the housing includes a circumferential groove for rotatingly receiving a protective device which extends coaxially relative to the longitudinal axis and which is connected to one of the lubricating grooves.

5. A centered double universal joint according to claim 1, wherein said guiding disc includes a cylindrical bearing bore extending coaxially relative to the longitudinal axis through the first centering projection and the second centering projection, said first centering mechanism and said second centering mechanism each including a bearing journal extending coaxially relative to an axis of rotation of the respective outer joint yoke, a bearing ball for each bearing journal in the form of a spherical layer having a spherical outer face, a through-bore in said bearing ball for positioning said bearing ball on the bearing journal, at least axially relative to the axis of rotation, and a bearing race for each bearing ball pivotally supporting the outer face of the bearing ball in a corresponding hollow-spherical bore, and said bearing race having a cylindrical outer face for axially adjustably positioning said bearing race in the cylindrical bearing bore of the guiding disc.

* * * * *